United States Patent [19]
Thomson et al.

[11] Patent Number: 6,038,430
[45] Date of Patent: Mar. 14, 2000

[54] METHOD AND APPARATUS FOR IMPROVING TRANSMISSION OF DATA IN A WIRELESS NETWORK

[75] Inventors: Larry Steve Thomson, Grass Valley; Carl Alelyunas, Nevada City, both of Calif.; Bert Buxton, Bellevue, Wash.

[73] Assignee: 3Com Corporation, Santa Clara, Calif.

[21] Appl. No.: 08/987,982

[22] Filed: Dec. 10, 1997

[51] Int. Cl.[7] ...................................................... H04B 1/00
[52] U.S. Cl. .................................. 455/72; 455/43; 455/72
[58] Field of Search ..................................... 375/222, 249; 333/14; 455/72, 575, 422, 557, 63, 43

[56] References Cited

U.S. PATENT DOCUMENTS

| | | | |
|---|---|---|---|
| 4,661,851 | 4/1987 | Muterspaugh | 358/144 |
| 4,704,726 | 11/1987 | Gibson | 381/13 |
| 5,058,202 | 10/1991 | Leveque | 455/43 |
| 5,226,178 | 7/1993 | Eastmond et al. | 455/23 |
| 5,507,033 | 4/1996 | Dolan | 455/33.1 |

*Primary Examiner*—Wellington Chin
*Assistant Examiner*—Blane J. Jackson
*Attorney, Agent, or Firm*—Workman, Nydegger & Seeley

[57] ABSTRACT

A method and apparatus are provided that improve data transmissions in a wireless network, optimized for the transmissions of voice signals, by companding data signals electrically about a spectral shaping module in data handling devices, preferably modems, at both the transmitting and receiving ends of the wireless network. At the transmitting end, the companding is performed by a compressor, electrically preceding a data de-emphasis module, and an expander, electrically succeeding the data de-emphasis module. At the receiving end, the companding is performed by a compressor, electrically preceding a data pre-emphasis module, and an expander, electrically succeeding the data pre-emphasis module. At both ends of the wireless network, companding better serves to facilitate the transmission of data across the wireless network because complimentary functions are performed symmetrically at both ends and because data streams are more complimentarily coupled to, and from, wireless transceivers that similarly perform companding electrically about voice and data streams between the transmitting and receiving ends. Such wireless transceivers being spectrally optimized for voice signal transmissions wherein spectral advantages occurring for voice signals causes spectral disadvantages for data signals within the same transceiver.

19 Claims, 4 Drawing Sheets

METHOD AND APPARATUS FOR IMPROVING TRANSMISSION OF DATA IN A WIRELESS NETWORK

BACKGROUND OF THE INVENTION

1. The Field of the Invention

The present invention relates generally to data transmissions in a wireless network. More particularly, the present invention relates to a method and apparatus for improving transmissions of a data stream in a voice optimized network.

2. The Relevant Technology

Wireless communication systems have become increasingly more prevalent and have contributed greatly to the dynamic nature of modem society. In general, wireless communication systems enable individuals to maintain communication contact with other users at either fixed site, mobile stations, or both. In the past, however, wireless communication systems were predominantly limited to, and primarily tailored for, voice users, such as wireless users interacting with other users or systems using verbal communication. Thus, in order to improve customer satisfaction, wireless communication systems have been increasingly adapted to favorably facilitate communication beyond that of mere voice communications.

For example, wireless communication systems are additionally used for the transmission of data information such as that used in paging, faxing and other similarly related digital transmission technologies. Yet, until recently, digital transmissions tended simply to accommodate digital data by employing low transmission data rates. Although adequate for small amounts of digital data, low transmission rates are extremely inadequate for the substantially larger amounts of data tending to be transmitted in today's wireless networks. In particular, the transmission of substantial amounts of digital data at low data rates congests communication channels, especially those data transmissions in analog cellular networks where reliable transmissions occur at low data rates around 9600 bits per second.

An additional and increasingly more popular use of wireless data transmission involves wireless access of the Internet. Such access enables a user, having a personal portable computer coupled via a modem to a wireless transceiver, to access vast amounts of digital data from both remote and mobile locations. Because of the large amounts of data typically transferred during such Internet activities, customer-satisfactory modems now require data-transfer rates of at least 28.8 kilobits per second and higher. Accordingly, to facilitate such high data-transfer rates, modems have become increasingly more sophisticated.

The problem, however, is that wireless transceivers, because of their still large aptitude for predominantly communicating in voice transmissions, are not yet fully adapted for data transmissions and cannot yet efficaciously handle such large data-transfer rates. In fact, most wireless transceivers (i.e., cellular phones) are still only able to transmit data if coupled to an additional hardware device such as a wireless modem. Even further compounding the problem is the known characteristic that spectrally defined voice and data streams exhibit radically different spectral profiles, to which, the wireless transceivers spectrally favor the voice over the data.

Figure 1:
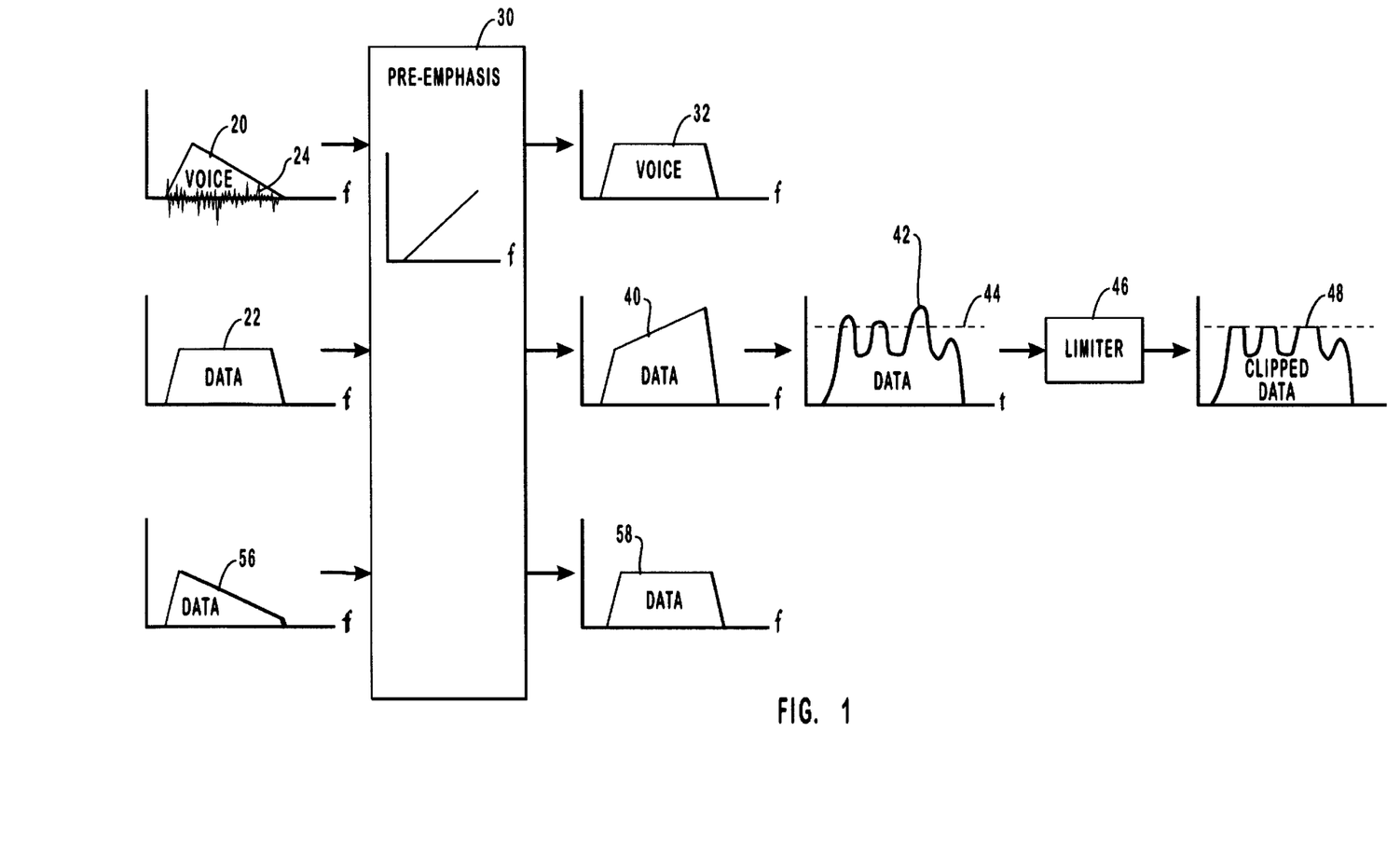
FIG. 1 is a known spectral diagram of voice and data streams subjected to pre-emphasis spectral shaping before transmission across a wireless communication network.
Figure 2:
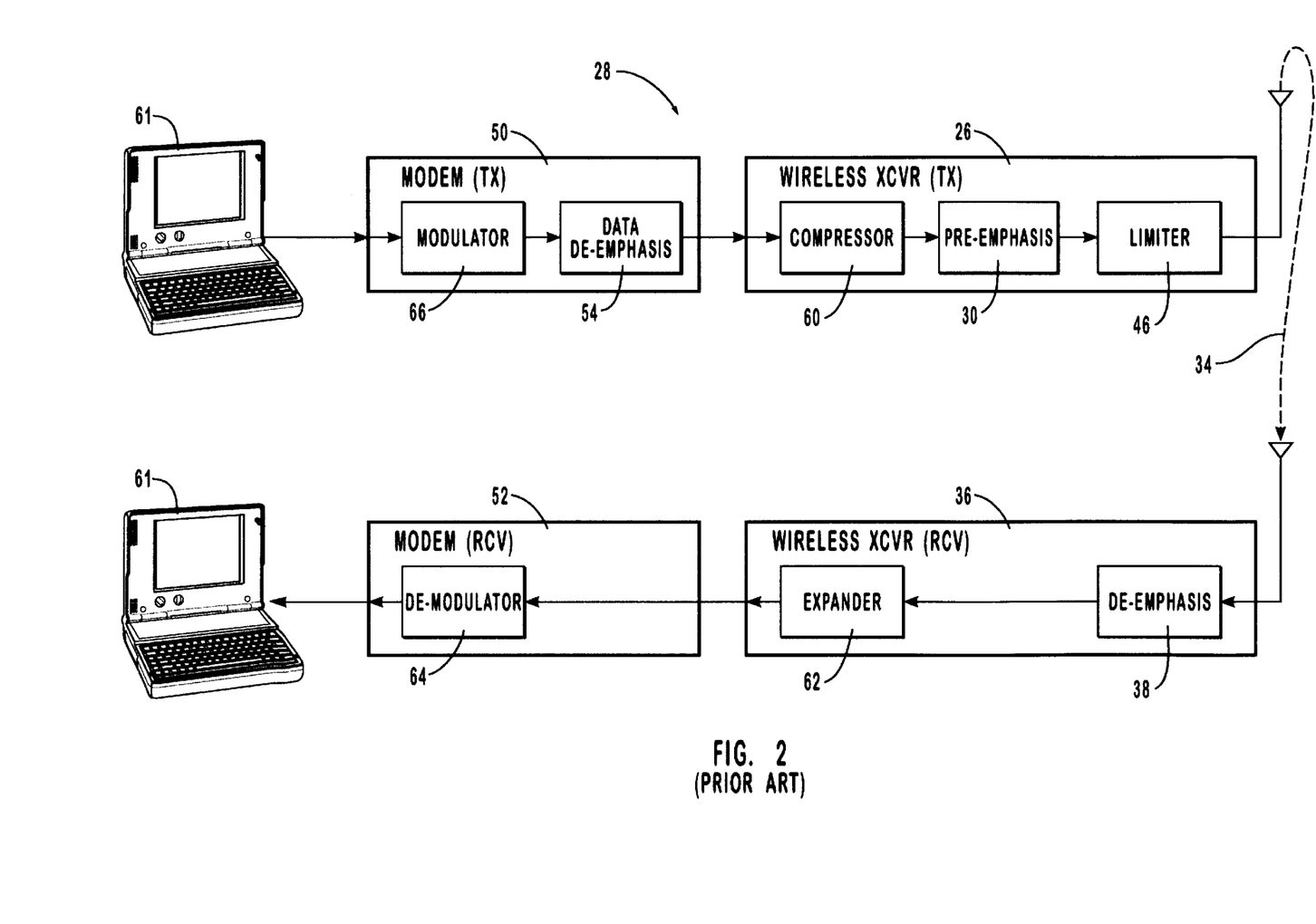
FIG. 2 is a block diagram of an exemplary prior art configuration of a wireless communication network capable of spectrally pre-processing data streams before transmission across the wireless communication network.

For example, with reference to FIGS. 1 and 2, it can be seen that the respective spectral amplitude distributions for voice 20 and data 22 streams are dissimilar, especially with respect to the higher frequencies. In particular, the spectral profile of voice stream 20 typically exhibits large amplitude levels at lower frequencies and diminished amplitude levels at higher frequencies. Whereas, the spectral profile for data stream 22, contrastingly, maintains a relatively constant or uniform amplitude level across the entire frequency spectrum.

In this manner, if voice stream 20 were directly modulated in a communication network without undergoing any spectral modifications, noise contamination 24, acquired through the communication channel, for example, would be so close in magnitude to the lower amplitude levels of the higher frequencies that the low amplitude levels would be adversely affected by, and generally indistinguishable from, the noise. Therefore, conventional wireless transceivers 26 (FIG. 2) at the transmitting end of an exemplary wireless communication network 28 typically house a pre-emphasis module 30. The pre-emphasis module 30 boosts the low spectral amplitude levels of the voice stream 20 at the higher frequencies to yield a pre-emphasized voice stream 32 (FIG. 1). By boosting the higher frequencies, the voice information becomes more robust and less susceptible to interference from noise 24 injected when transmitted through a communication channel 34. In other words, if the injected noise floor remains roughly constant across all frequencies, then the boosted amplitude levels of the higher frequencies enables wireless transceiver 36 at the receiving end to extract the higher frequencies out of the communication channel noise floor. Post-processing of pre-emphasized voice stream 32, through a de-emphasis module 38 at the receiving end of the wireless network, is typically employed to reduce the amplitudes of the higher frequencies back to the typical voice information profile similar to that shown in voice stream 20.

A problem with pre-emphasizing the voice stream, however, exists because data stream 22 must also passes through pre-emphasis module 30 of wireless transceiver 26. As a consequence, the data stream amplitude levels at the higher frequencies are also further augmented as shown in the frequency domain, as pre-emphasized data stream 40, and in the time domain, as pre-emphasized data stream 42. Because higher amplitude levels correspondingly cause a spread in the frequency spectrum of an FM signal, as is well known in the art, and because each channel within a wireless network 28 has an assigned frequency bandwidth, a time domain limiter 46 is employed to clip the higher amplitude levels of the data stream when such augmented amplitude levels exceed a certain, pre-determined amplitude threshold 44. This prevents bandwidth interference between neighboring channels. Such clipping, however, adversely affects the integrity of the data as shown in the clipped data information profile 48. Furthermore, clipped data results in non-linear distortion of the original data information which greatly facilitates the introduction of transmission errors.

Consequently, the prior art has attempted to remedy this problem. Although some effective remedies could include hardware and software changes internally within the confines of the wireless transceiver, such remedies are not cost effective because they entail redesign and/or physical manipulation of components therein. In addition, such manipulation often voids consumer warranty protections that might exist. As such, most remedies take place in data communication devices that electrically precede the wireless transceivers at the transmitting end of the wireless communication network. Most frequently, the data communication devices are wireless modems 50, 52. At the transmitting end, wireless modems 50 reduce the amplitude levels of the data stream 22 at the higher frequencies at stages prior to the introduction of the data stream into the wireless transceiver 26 so that when the data stream passes through the pre-emphasis module 30, the higher amplitude levels will not be clipped. In particular, prior art configurations have included within modem 50 a data de-emphasis module 54 to pre-condition the data stream such that the signal spectrum will be approximately flat after passing through pre-emphasis module 30. As a result, by reducing, or de-emphasizing, the amplitude of the higher frequency components of the data stream, the de-emphasized data stream 56 is better able to benefit from the processing of the pre-emphasis module 30 that is resident within the wireless transceiver. Such de-emphasized data stream, when presented to pre-emphasis module 30, becomes again emphasized in the higher frequencies thus giving the appearance of the originally flat-spectrumed data stream as depicted by data profile 58. Thus, the frequency components are less susceptible to the influence of noise when introduced through the communication channel.

An additional problem, however, is that conventional wireless transceivers further comprise a compressor stage 60, often overlooked by engineers designing modem interfaces between computers 61 and wireless transceivers, that precedes the pre-emphasis module 30. Although compressors are well known in the art, it is their electrical sequential positioning within the wireless transceiver that has been greatly overlooked. The compressor positioning, it should be appreciated, is after the data de-emphasis module 54 in modem 50 but before pre-emphasis module 30 in wireless transceiver 26, which is all sequentially before the voice and/or data streams are transmitted across communication channel 34. The problem of overlooking the sequential positioning of modules causes the data stream to enter pre-emphasis module 30 in the wireless transceiver after having been previously compressed whereas, in contrast, the same data stream has previously undergone de-emphasis in de-emphasis module 54 of modem 50 without having undergone compression. Although such sequential positioning would not be as crucial if the compressor were a linear device, it matters greatly because compressors in wireless transceivers are highly non-linear which creates a very different signal upon passage therethrough.

On the receiving end of the wireless network, the problem of sequential ordering is further complicated because the reverse, or complimentary, functions performed to reverse what was performed by the transmitting end, takes place in the wireless transceiver, (i.e., reversing the pre-emphasis, expanding in expander stage 62, and undoing the compression). It should be apparent that no reversal, or complimentary, functions take place in receiving end modem 52, other than typical functions such as de-modulation in demodulator 64 undoing the modulation from modulator 66 performed on the data stream. Whereas, it should be appreciated, the entire de-emphasis of the data stream took place in the data de-emphasis module in the transmitting end modem 50. Thus, system mismatch has occurred which lends itself to the introduction of further errors in the transmission of data through a wireless network. Therefore, systems and methods are needed for improving the transmission of data across a wireless network via a wireless transceiver that is adapted, and optimized, for voice transmissions.

SUMMARY AND OBJECTS OF THE INVENTION

It is, therefore, an object of the present invention to provide a data handling device compatible with wireless transceivers, optimized for voice streams, that improves transmission of data across a wireless network.

It is another object of the present invention to provide a wireless transceiver modem compatible with wireless transceivers, optimized for voice streams, that improves transmission of data across a wireless network.

It is a further object of the present invention to provide a data handling device capable of performing complimentary functions to a data stream at both the transmitting and receiving ends of a wireless network.

Yet another object of the present invention is to provide a data handling device capable of complimentarily companding a data stream at both the transmitting and receiving ends of a wireless network.

Still another object of the present invention is to provide a data handling device capable of complimentarily companding a data stream at a singular location at either the transmitting or receiving end of a wireless network.

A concomitant object of the present invention is to provide methods for cooperating a data handling device, capable of complimentarily companding a data stream, with wireless transceivers at both the transmitting and receiving ends of a wireless network.

In accordance with the invention as embodied and broadly described herein, the foregoing and other objectives are achieved by providing a method and apparatus for improving data transmissions in a wireless network optimized for the transmissions of voice streams. Improvement occurs as a result of companding data streams electrically about a spectral shaping module in data handling devices, preferably modems, at both the transmitting and receiving ends of the wireless network. At the transmitting end, the companding is performed by a compressor, electrically preceding a data de-emphasis module, and an expander, electrically succeeding the data de-emphasis module. At the receiving end, the companding is performed by a compressor, electrically preceding a data pre-emphasis module, and an expander, electrically succeeding the data pre-emphasis module. At both ends of the wireless network, companding better serves to facilitate the transmission of data across the wireless network since complimentary functions are performed symmetrically at both ends and because data streams are more complimentarily coupled to, and from, wireless transceivers that similarly perform companding electrically about voice and data streams between the transmitting and receiving ends. Such wireless transceivers, being spectrally optimized for voice stream transmissions wherein spectral advantages occurring for voice streams causes spectral disadvantages for data streams within the same transceiver, is set forth describing preferred embodiments herein.

In an alternate embodiment, the companding of the data stream occurs electrically about a spectral shaping module in a data handling device that is electrically adapted to cooperate between other devices, such as a wireless transceiver and a modem, in order to facilitate adaptation to existing communication devices in a wireless network.

In yet another alternate embodiment, at the transmitting end, the companding of the data stream occurs electrically about a spectral shaping module in a modem at either electrical end of a modulator used for modulating the data stream before coupling the data stream to a wireless transceiver for transmission across a communication channel. At the receiving end, the companding of the data stream occurs electrically about a spectral shaping module in a modem at either electrical end of a de-modulator used for de-modulating the data stream after the data stream is coupled from a wireless transceiver receiving data from across a communication channel.

These and other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered to be limiting of its scope, the invention in its presently understood best mode for making and using the same will be described and explained with additional specificity and detail through the use of the accompanying drawings in which.

DETAILED DESCRIPTION OF THE PREFERRED EMBODIMENTS

The present invention is directed towards a method and apparatus for improving transmissions of a data stream in a voice optimized network by "companding" the data stream electrically about a spectral shaping module in data handling devices, preferably modems, at both the transmitting and receiving ends of the wireless network. As used herein, companding, or companded, refers to the past and present tense of the word combination formed from the operation of the electrical compressing and expanding that is respectively performed in compressors and expanders well known to those skilled in the art. The companding performed at both ends of the wireless network better serves to facilitate the transmission of data across the wireless network because complimentary functions are performed symmetrically at both ends of the wireless network. The companding performed at both ends of the wireless network even further serves to facilitate the transmission of data across the wireless network because it more complimentarily couples data to, and from, wireless transceivers at the transmitting and receiving ends. Such wireless transceivers being spectrally optimized for voice stream transmissions wherein spectral advantages occurring for voice streams causes spectral disadvantages for data streams within the same transceiver.

Figure 3:
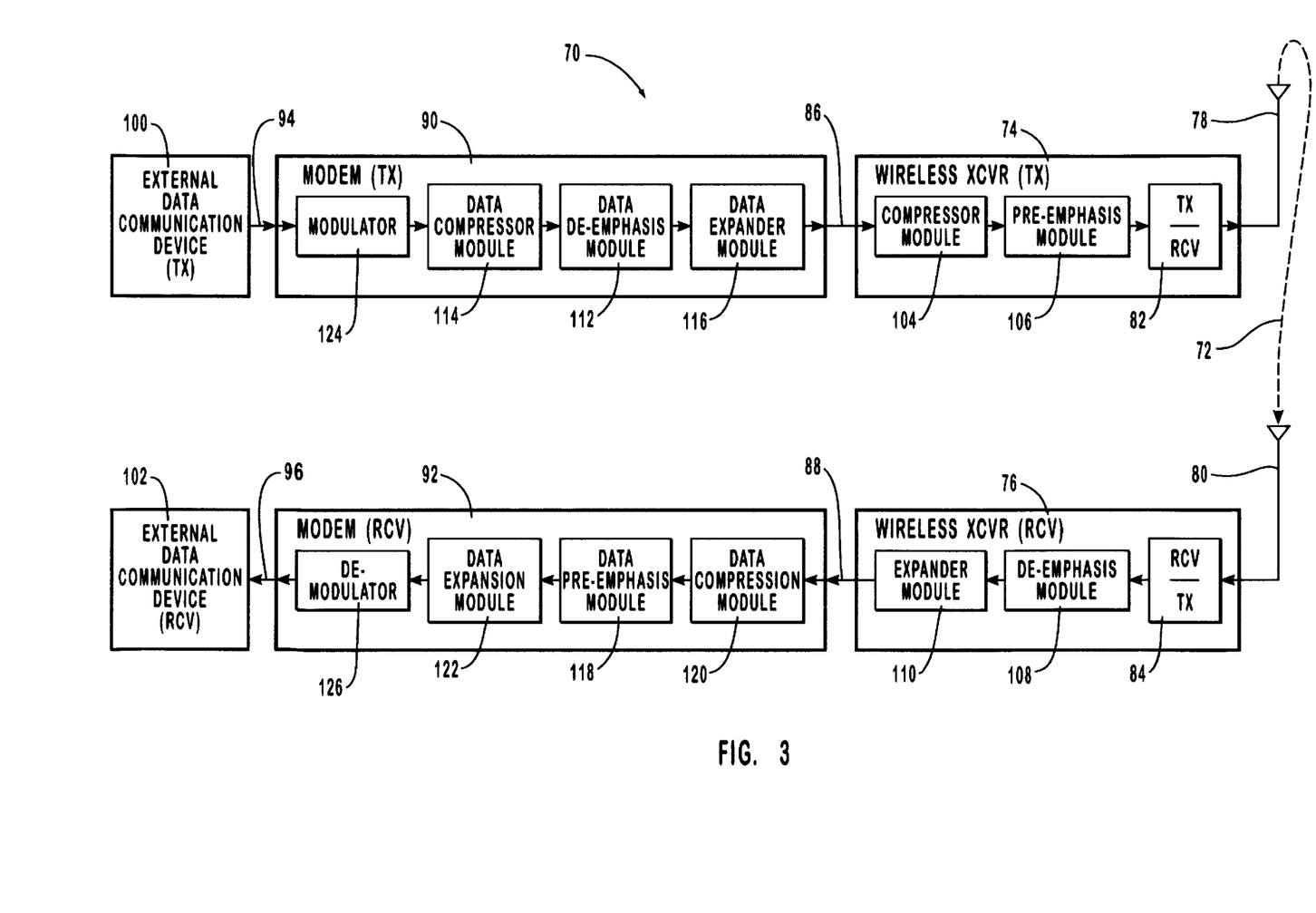
FIG. 3 is a block diagram of an exemplary wireless communication network, in accordance with the present invention, having a modem at both the transmitting and receiving ends of the network capable of compressing and expanding a spectrally shaped data stream.

With reference to FIG. 3, an exemplary wireless communication network 70, in accordance with the present invention, is depicted as part of a traditional analog cellular phone configuration. It should be appreciated, however, that the present invention is not limited to the configuration represented generally as wireless communication network 70. All wireless configurations having primary utility in the transmission of voice information are to be considered within the scope of this invention. In FIG. 3, the wireless communication network comprises a transmitting and a receiving end separated by a communication channel 72. On each end, wireless transceivers 74 and 76 is depicted as having transceiving antennae 78 and 80, respectively, electrically connected to an internal transmit/receive module 82 and 84 for facilitating the transmissions and reception of information across a wireless network as is well known in the art. It should be appreciated that the description "module," used in conjunction with any of the building blocks in the block diagrams, refers in a generic sense to either hardware, software or combinations thereof, that electrically and/or physically implement the basic function of the building block depicted. The blocks, however, should not be construed as being limited to either of the representations. Furthermore, both the terms "hardware" and "software" should be construed liberally and encompass software modules capable of executing computer readable instructions and physical components, such as microprocessors, integrated circuits and discrete electronics, executing, individually and in combination with other physical components or other software modules, routines, programs, objects, data structures, etc. that perform particular tasks or implement particular abstract data types. The software and hardware may be either internal to the wireless transceivers or be inserted/attached such as through use of a card, for example.

At both the transmitting and receiving ends of the wireless communication network are wireless transceiver modems 90 and 92 electronically coupled by way of a first set of bi-directional data communication lines 86 and 88, to wireless transceivers 74 and 76. The bi-directional data communication lines 86 and 88 are well known transmission lines in the art and, although are bidirectional for allowing data communication to be transferred in both directions between the wireless transceivers and modems, have been depicted as uni-directional for the purposes of illustrating a flow of data being processed from the transmitting to the receiving end of the wireless network. Similarly, a second set of bi-directional data communication lines 94 and 96 are uni-directionally depicted between the transmitting and receiving wireless transceiver modems 90 and 92 and a transmitting and receiving external data communication device 100 and 102, respectively.

External data communication devices 100 and 102 (hereinafter DCD) are also well known in the art and can represent a variety of devices handling data such as general and special purpose computers, hand-held devices, multi-processor systems, microprocessor-based or programmable consumer electronics, network PCs, minicomputers, computer clusters mainframe computers, other varieties of wireless transceivers and modems and many other similarly related devices. It should be appreciated that although wireless transceiver modems 90 and 92 (hereinafter, modems) have been depicted as external to the DCD's 100 and 102, they very well may be, and often are, housed internally within those DCD's 100 and 102.

In operation, data is transmitted or communicated from transmitting DCD 100 to receiving DCD 102 through wireless communication network 70 in the following sequence: (i) a data stream is generated by transmitting DCD 100; (ii) the data stream is coupled therefrom to transmitting modem 90; (iii) the data stream is coupled to transmitting wireless transceiver 74 and transmitted across communication channel 72 by way of transmit module 82 and transmit antennae 78; then, in reverse order (iv) the data stream is received at the receiving end by receiving antennae 80 and receiving module 84; (v) coupled from wireless transceiver 76 to receiving modem 92; and (vi) then coupled to receiving DCD 102.

As described in the background section in relation to FIG. 1, spectrally defined data streams 22 exhibiting relatively constant or substantially uniform amplitude levels across a frequency spectrum, and having a range from low to high frequencies, are known. Such spectrally known data streams are equally applicable to the present invention and are representative of the data streams described herein. Likewise, spectrally defined voice streams 20 exhibiting large amplitude levels at lower frequencies and diminished amplitude levels at higher frequencies are known and are representative of voice streams described herein.

As further described in the background section, compressors and expanders are known, of which, the wireless transceiver 74 electrically compresses the data stream coupled therethrough in a compressor module 104 before the data stream is spectrally altered in a pre-emphasis module 106. Again, this achieves a spectrally favorable result for voice stream information being transmitted through the wireless transceiver at the spectral expense of the data stream. Also, as previously described, in order to fully recover the transmitted data and voice streams, the receiving end must complimentarily reverse those functions done on the transmitting end. With the present invention, complimentary spectral de-emphasis is performed in a de-emphasis module 108 to reverse the pre-emphasis, and electrical expansion performed in an expander module 110 to reverse the compression.

A prominent difference separating the prior art from the present invention, however, is that the data stream, taught herein, is coupled to wireless transceiver 74 and 76 in a fundamentally different manner than in previous prior art configurations. In particular, the data stream, although again spectrally processed in transmitting modem 90 by way of a data de-emphasis module 112, the data stream is electrically companded about data de-emphasis module 112 before being coupled to the wireless transceiver on the transmitting end. Moreover, the present invention also performs spectral shaping in modem 92 on the receiving end as well as a companding operation complimentary to the one performed on the opposite transmitting end. The result of companding the data stream in both the transmitting and receiving modems 90 and 92 is improved data compatibility between modems and transceivers.

The companding is performed in transmitting modem 90 by a data compressor module 114, electrically preceding the data de-emphasis module 112, and a data expander module 116, with data expander module 116 electrically succeeding the data de-emphasis module 112. Data compressor module 114 amplifies low-level signals to overcome noise, such as a soft voice spoken into a cellular phone, and attenuates, or compresses, high-level signals, such as a loud voice, to prevent distortion. In the preferred embodiment, compression is performed in a 2:1 ratio. Contrastingly, data expander module 116 reverses the compression performed in data compressor module 114 and expands the original data stream back to its primary dynamic range.

While it might not be evident that there is any benefit to spectrally shaping the data signal by performing compression and then subsequently performing expansion, it should be appreciated that there is a substantial difference because of the non-linearity of the compression and expansion functions as they act upon a data signal. Thus, as taught by the present invention, distortion is minimized during transmission and reception of the data signal because the transmitter and receiver modems "oppositely" perform the functions performed in the transceiver. In contrast, the prior art, upon signal transmission, merely de-emphasizes the data signal without companding. Thus, the prior art does not minimize non-linearity effects and distortion is introduced. Ultimately, performance in prior art devices is degraded. It should be further appreciated that since the companding functions taught herein reduce distortion, higher data transmission speeds and/or lower bit error rates are realized. Moreover, "quick-fix" attempts in prior art devices to recover the signal by simply pre-emphasizing or by adaptively equalizing will likewise not reduce non-linearity effects because the "opposite" functions are still not performed.

One complimentary, or reversal, function performed in receiving modem 92 includes the spectral shaping of the data stream in a data pre-emphasis module 118. In this manner, data de-emphasis module 112, which selectively alters the higher frequencies of the spectrally defined data stream is reversed by data pre-emphasis module 118, in the receive modem. Data pre-emphasis module 118 inversely spectrally shapes the data stream by selectively altering the higher frequencies of the data stream to return the data stream to the originally flat-spectrumed data profile. Preferably, the amplitude levels of the higher frequencies of the data stream are reduced with respect to the lower frequencies in data de-emphasis module 112, in the transmit modem, and the amplitude levels of the same data stream, having been transmitted across the communication channel, are increased at the higher frequencies with respect to the lower frequencies, in data pre-emphasis module 118 in the receive modem. Resultingly, the originally transmitted data stream is recaptured at the reception end of the wireless communication network with characteristics closer to that of the transmitted stream as compared to those prior art configurations not performing spectral shaping functions in the receiving modem.

Another complimentary, or reversal, function performed in receiving modem 92 includes the electrical compression of the data stream in a data compression module 120, electrically preceding data pre-emphasis module 118, and electrical expansion of the data stream in a data expansion module 122, with data compression module 120 electrically succeeding data pre-emphasis module 118. While data pre-emphasis module 118 reverses the functions of data de-emphasis module 112, the companding functions performed thereabout enables the data stream to be presented to data pre-emphasis module 112 in a manner complimentary to the manner the data stream was presented to the data de-emphasis module 112. It should be appreciated that the terms defining the building blocks data "compressor" module 114 and data "compression" module 120 are equivalent but are slightly different for the elementary purposes of differentiating between the transmit modem and the receive modem. Similarly, the data "expander" module 116 and the data "expansion" module 122 are likewise differentiated.

Figure 4:
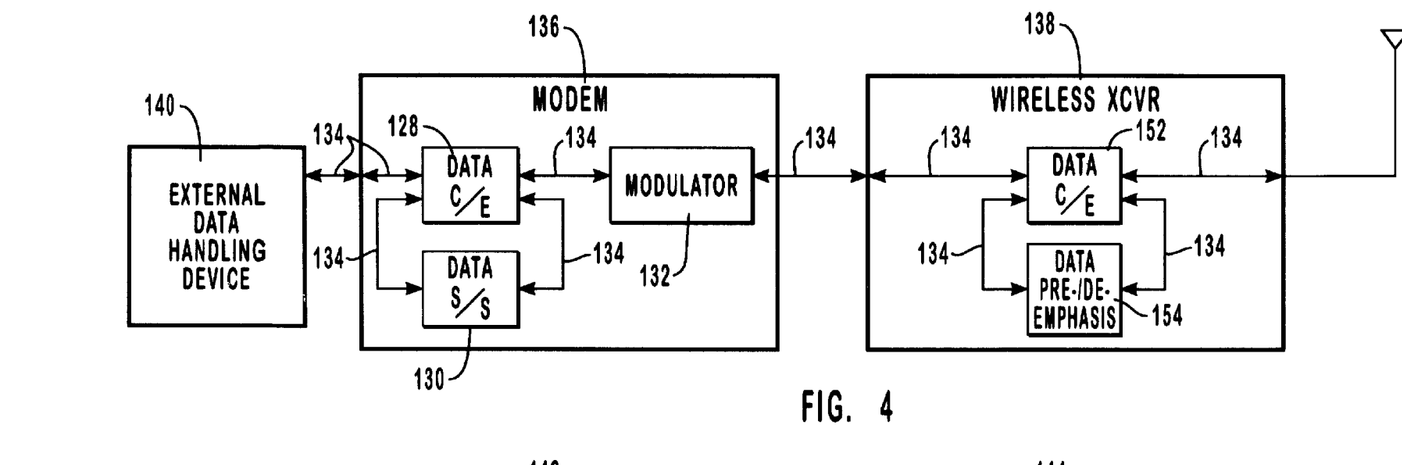
FIG. 4 is a block diagram of a wireless transceiver and modem suitable for use in a wireless communication network each capable of companding a spectrally shaped data stream, in accordance with another embodiment of the present invention.

As depicted in FIG. 3, the companding of the data stream in the modems is performed electrically about a spectral shaping module, (i.e., the data pre- and de-emphasis modules 112,118) after the data stream has been modulated by modulator 124, in the transmitting modem 90, and before the data stream has been de-modulated by demodulator 126 in receiving modem 92. It should be appreciated, however, that the present invention is not so limited. With reference to FIG. 4, another embodiment of the present invention is presented whereby a data companding module 128, is electrically coupled about a data spectral-shaping module 130, in electrical precedence to the modulator 132 in a transmit modem as opposed to being in electrical succession.

It should be appreciated from FIG. 4 that the data communication lines 134 that exist between individual modules in modem 136, between individual modules in the wireless transceiver 138 and externally therebetween, to include the external data communication device 140, are depicted as being bidirectional because each of modem 136, wireless transceiver 138 and external data handling device 140 are all bidirectional communication devices. They are all able to cooperate together on either the transmitting or receiving end of a wireless communication network and can each individually perform all the necessary functions thereof, although, as illustrated in the previous figures, were previously depicted as being unidirectional communication devices. As such, data compression or expansion is performed in module 152 electrically about the data pre- or de-emphasis module 154 in the wireless transceiver 138 and modulator 132 in modem 136, is equally a demodulator for receiving a data stream when on the receiving end of the network. Thus, in operation as part of either the transmitting or receiving end, the (de-) modulator 132 is coupled on an electrically opposite side of the data companding and the data spectral shaping modules 128 and 130. In particular, on the transmitting end, the data companding and spectral shaping modules electrically precede the modulator and, on the receiving end, the data companding and spectral shaping modules electrically succeed the de-modulator. Such arrangement is in even further contrast to prior art configurations. Other surprising advantages have been realized by performing data spectral-shaping functions on the electrically opposite side of the (de-) modulator and are further described in the applicant's U.S. application, Ser. No. (not yet assigned) filed on Jul. 10, 1997, for "Methods and Apparatus for Improving a Transmission Data Rate of Baseband Data in a Wireless Network," expressly incorporated herein by reference.

Figure 5:
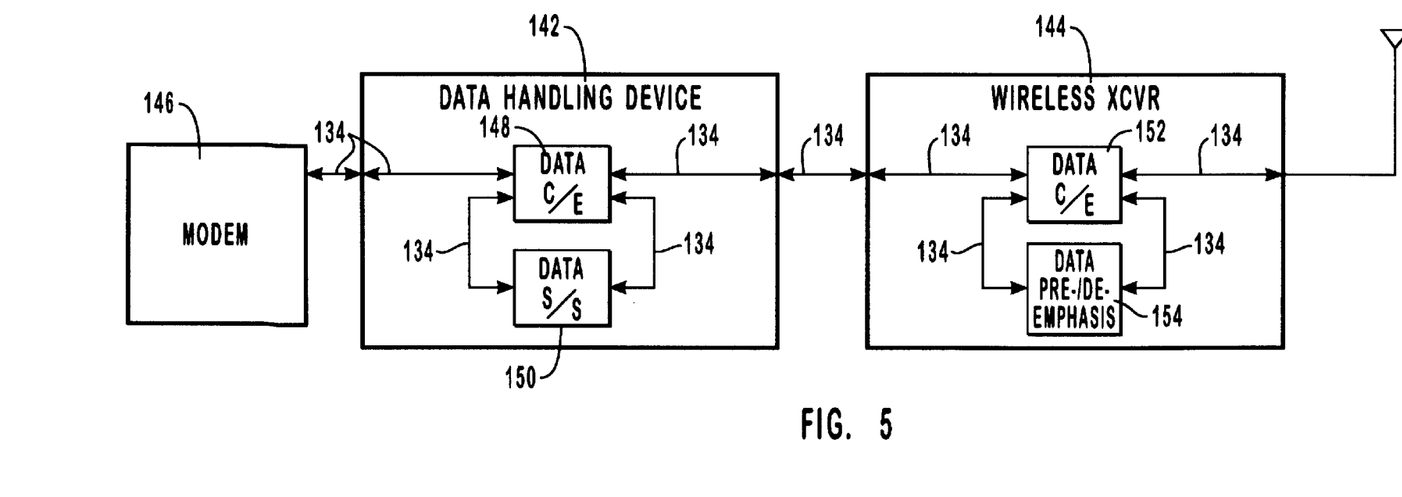
FIG. 5 is a block diagram of a data handling device electrically coupled between a wireless transceiver and modem suitable for use in a wireless communication network, the 24 data handling device being capable of companding a spectrally shaped data stream, in accordance with yet another embodiment of the present invention.

With reference to FIG. 5, it should be appreciated that the present invention teaches beyond the technology limited to modems. In fact, the scope of the present invention extends to any data handling device 142 that can be coordinated with any variety of other communication devices, such as a wireless transceiver 144 and a modem 146, for the purposes of companding via companding module 148 a data stream electrically about a data spectral-shaping device 150 at either the transmitting or receiving end in a wireless communication network, or both. Accordingly, the embodiment of data handling device 142 having a data companding module electrically coupled about a data spectral-shaping module is depicted bi-directionally. In this manner, data handling device 142 provides adaptive coupling between pre-existing data communication devices for retrofit purposes at either, or both, the transmitting or receiving end of a wireless network.

The present invention may be embodied in still other specific forms without departing from its spirit or essential characteristics. The described embodiments are, therefore, to be considered in all respects only as illustrative and not restrictive. The scope of the invention is indicated by the appended claims rather than by the foregoing description. All changes which come within the meaning and range of equivalency of the claims are to be embraced within their scope.

What is claimed and desired to be secured by United States Letters Patent is:

1. A data handling device for improving transmission of data in a wireless network, comprising:
   a spectral shaping module for selectively spectrally shaping amplitude levels for a spectrally defined data stream across a frequency spectrum having low and high frequencies associated therewith;
   a compressor module electrically preceding said spectral shaping module for compressing said data stream; and
   an expander module electrically succeeding said spectral shaping module for electrically reversing the compression performed by said compressor module so that, in operation, said data stream is sequentially processed through said compressor, said spectral shaping and said expander modules in preparation for said data stream to be electrically coupled to a wireless transceiver of said wireless network.

2. The data handling device according to claim 1, wherein said spectral shaping module selectively alters said amplitude levels of said data stream by one of hardware implementation and software implementation means.

3. The data handling device according to claim 2, wherein said data handling device is capable of both transmitting and receiving, said spectral shaping module selectively alters said amplitude levels of said data stream by one of reducing and increasing said amplitude levels of said high frequencies with respect to said low frequencies depending upon whether said spectrally defined data stream is one of being transmitted and received, respectively, across said wireless network.

4. The data handling device according to claim 3, wherein said spectral shaping module selectively alters said amplitude levels of said data stream in order to spectrally approximate said data stream as a voice stream.

5. The data handling device according to claim 4, wherein said spectral shaping module selectively alters said amplitude levels of said data stream by increasing said amplitude levels of said high frequencies with respect to said low frequencies in order to spectrally return said data stream from being spectrally approximated as said voice stream to having substantially uniform amplitude levels across said frequency spectrum.

6. The data handling device according to claim 3, further comprising means for electrically coupling said data stream to said external data communication device.

7. The data handling device according to claim 1, wherein said data handling device is a modem.

8. The data handling device according to claim 1, wherein said spectral shaping module is one of a data de-emphasis module and a data pre-emphasis module.

9. The data handling device according to claim 1, wherein said data stream is sequentially processed, in operation, through said compressor, said spectral shaping and said expander modules as one of:
   at a transmitting end in said wireless network as one of electrically preceding and succeeding a modulator; and
   at a receiving end in said wireless network as one of electrically preceding and succeeding a de-modulator.

10. A modem for improving transmission of data in a wireless network, comprising:

a data de-emphasis module for spectrally shaping a first data stream into a first signal having spectral amplitudes at higher frequencies lower than spectral amplitudes at lower frequencies and a data pre-emphasis module for spectrally shaping a second signal having spectral amplitudes at said higher frequencies higher than spectral amplitudes at said lower frequencies into a second data stream;

a first data compressor module electrically preceding said data de-emphasis module for compressing first input data stream and a second data compressor module electrically preceding said data pre-emphasis module for electrically compressing a second input signal; and a first data expander module electrically succeeding said data de-emphasis module for reversing said compression performed by said first data compressor module in preparation for said first signal to be electrically coupled to a wireless transceiver and a second data expander module electrically succeeding said data pre-emphasis module for reversing said compression performed by said second data compressor module in preparation for said second data stream to be electrically coupled to an external data communication device.

11. The modem according to claim 10, further comprising one of:

(i) a modulator operably coupled with said first data compressor module for modulating said first input data stream; and (ii) a de-modulator operably coupled with said second data expander module for demodulating data as received from said second data expander module.

12. A system for improving transmission of data in a wireless communication network, comprising:

a wireless transceiver having
  (a) a spectral shaping module for selectively spectrally shaping amplitude levels for spectrally defined voice and data streams across a frequency spectrum having low and high frequencies associated therewith; and
  (b) a compressor module electrically preceding said spectral shaping module for electrically compressing said voice and data streams; and a wireless transceiver modem having
  (a) a data spectral shaping module for selectively altering amplitude levels of said data stream across said frequency spectrum; and
  (b) a data compander module arranged electrically about said data spectral shaping module for sequentially compressing said data stream and for electrically reversing the compression thereof.

13. The system according to claim 12, further comprising electrical coupling means between said wireless transceiver modem and said wireless transceiver.

14. The system according to claim 12, wherein said wireless transceiver further comprises an expander module for electrically reversing the electrical compression performed by said compressor module in preparation for said data stream to be electrically coupled to an external data communication device.

15. The system according to claim 14, wherein said external data communication device is said wireless transceiver modem.

16. In a wireless communication network, a method for improving transmission of data, the steps comprising:

(a) spectrally shaping a spectrally defined data stream in a data spectral shaping module across a frequency spectrum having low and high frequencies associated therewith by selectively altering amplitude levels of said data stream at selected frequencies across said frequency spectrum;

(b) electrically companding said data stream about said spectral shaping module in both a data compressor module and a data expander module, said data compressor module electrically preceding said data spectral shaping module, said data expanding module electrically succeeding said data spectral shaping module; and (c) modulating said data stream, the step of modulating said data stream being electrically one of preceding and succeeding said step of spectrally shaping said data stream.

17. The method according to claim 16, further comprising the step of coupling said data stream to a wireless transceiver having:

(a) a spectral shaping module for spectrally shaping said data stream and a spectrally defined voice signal across said frequency spectrum by selectively altering amplitude levels of said voice signal and said data stream at selected frequencies across said frequency spectrum; and (b) a compander module electrically preceding said spectral shaping module for one of electrically compressing said voice signal and said data stream and electrically expanding said voice signal and said data stream.

18. The method according to claim 17, further comprising the step of transceiving said voice signal and said data stream across a communication channel.

19. The method according to claim 16, wherein the step of spectrally shaping said data stream further comprises one of the following steps:

(a) reducing said amplitude levels of said data stream at said high frequencies relative to said low frequencies to approximate a spectrally defined voice stream; and (b) increasing said amplitude levels of said data stream at said high frequencies relative to said high frequencies to produce substantially uniform amplitude levels of said data stream across said frequency spectrum.

\* \* \* \* \*

UNITED STATES PATENT AND TRADEMARK OFFICE
CERTIFICATE OF CORRECTION

PATENT NO. : 6,038,430
DATED : March 14, 2000
INVENTOR(S) : Larry Steve Thomson; Carl Alelyunas; Bert Buxton It is certified that error appears in the above-identified patent and that said Letters Patent are hereby corrected as shown below:

Col. 1, ln. 15: before "society" change "modem" to --modern--

Col. 2, ln. 35: after "must also" change "passes" to --pass--

Col. 5, ln. 41: after "the" and before "data" delete [24]

Col. 6, ln. 17: after "74 and 76" change "is" to --are--

Col. 6, ln. 46: after "are" change "bidirectional" to --bi-directional--

Col. 8, ln. 61: after "module" change "112" to --118--

Col. 9, ln. 21: after "being" change "bidirectional" to --bi-directional--

Col. 9, ln. 23: before "communication" change "bidirectional" to --bi-directional--

Col. 9, ln. 46: after "Ser. No." insert -- 08/889,970--

Signed and Sealed this

Seventeenth Day of April, 2001

Attest:

NICHOLAS P. GODICI

Attesting Officer

Acting Director of the United States Patent and Trademark Office